(12) United States Patent
Calcev et al.

(10) Patent No.: US 10,250,315 B2
(45) Date of Patent: Apr. 2, 2019

(54) SYSTEM AND METHOD FOR INTER-BASIC SERVICE SET COMMUNICATIONS

(71) Applicant: Futurewei Technologies, Inc., Plano, TX (US)

(72) Inventors: George Calcev, Hoffman Estates, IL (US); Majid Ghanbarinejad, Rolling Meadows, IL (US); Diana Maamari, Rolling Meadows, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 97 days.

(21) Appl. No.: 15/393,040

(22) Filed: Dec. 28, 2016

(65) Prior Publication Data

US 2017/0195035 A1    Jul. 6, 2017

Related U.S. Application Data

(60) Provisional application No. 62/273,289, filed on Dec. 30, 2015.

(51) Int. Cl.
| | |
|---|---|
| H04B 7/14 | (2006.01) |
| H04B 7/0452 | (2017.01) |
| H04W 88/08 | (2009.01) |
| H04W 88/04 | (2009.01) |
| H04W 84/12 | (2009.01) |

(52) U.S. Cl.
CPC ............. *H04B 7/14* (2013.01); *H04B 7/0452* (2013.01); *H04W 84/12* (2013.01); *H04W 88/04* (2013.01); *H04W 88/08* (2013.01)

(58) Field of Classification Search
CPC ....... H04B 7/14; H04B 7/0452; H04W 84/12; H04W 88/08; H04W 88/04
See application file for complete search history.

(56) References Cited

U.S. PATENT DOCUMENTS

| | | | |
|---|---|---|---|
| 2008/0026787 A1 | 1/2008 | Ibrahim et al. | |
| 2008/0043873 A1 | 2/2008 | Ariyavisitakul | |
| 2014/0064257 A1 | 3/2014 | Fontaine et al. | |
| 2016/0073429 A1* | 3/2016 | Oteri | H04W 74/0816 370/338 |
| 2016/0174270 A1* | 6/2016 | Jeong | H04W 48/08 370/315 |

(Continued)

FOREIGN PATENT DOCUMENTS

WO    2015005677 A1    1/2015

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Computer Society, IEEE Std 802.11, Nov. 2007, 2793 pages.

(Continued)

*Primary Examiner* — Kwang B Yao
*Assistant Examiner* — Moo Jeong
(74) *Attorney, Agent, or Firm* — Slater Matsil, LLP (57) ABSTRACT

A method for multiple association includes associating with a first access point (AP) in a primary basic service set (BSS), associating with a second AP in a secondary BSS, informing the first and second APs of an inter-BSS relaying capability of a doubly-associated station, and relaying data between the first AP and the second AP.

22 Claims, 5 Drawing Sheets

(56) References Cited

U.S. PATENT DOCUMENTS

2017/0064583 A1* 3/2017 Roy .................. H04W 36/0005
2018/0206139 A1* 7/2018 Wang ................. H04B 7/15507

OTHER PUBLICATIONS

"Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," IEEE P802.11ad/D9.0, Jul. 2012, 679 pages.

* cited by examiner

SYSTEM AND METHOD FOR INTER-BASIC SERVICE SET COMMUNICATIONS

This application claims the benefit of U.S. Provisional Application No. 62/273,289, filed on Dec. 30, 2015, entitled "System and Method for Inter-BSS Communications," which application is hereby incorporated herein by reference.

TECHNICAL FIELD

The present invention relates generally to a system and method for digital communications, and, in particular embodiments, to a system and method for inter-basic service set (BSS) communications.

BACKGROUND

Millimeter-wave (mmWave) communications, such as provided by IEEE 802.11ad technical standards, utilize directional antennas and offers increased antenna gain and spatial separation. While directional communications offer additional gain that compensate for the large pathloss experienced in mmWave communications, line-of-sight (LOS) blockage remains one of the main factors for disruption of communications.

SUMMARY

Example embodiments provide a system and method for inter-BSS communications.

In accordance with an example embodiment, a method for multiple association is provided. The method includes associating, by a doubly-associated station, with a first access point (AP) in a primary basic service set (BSS), associating, by the doubly-associated station, with a second AP in a secondary BSS, informing, by the doubly-associated station, the first and second APs of an inter-BSS relaying capability of the doubly-associated station, and relaying, by the doubly-associated station, data between the first AP and the second AP.

In accordance with an example embodiment, a method for multiple association is provided. The method includes selecting, by a first AP, a station capable of communicating with a second AP, where station is associated with the first AP in a primary BSS, instructing, by the first AP, the station to associate with the second AP in a secondary BSS, and transmitting, by the first AP, data, intended for the second AP, to the station.

In accordance with an example embodiment, a doubly-associated station is provided. The doubly-associated station includes a processor, and a non-transitory computer readable storage medium storing programming for execution by the processor. The programming including instructions to configure the doubly-associated station to associate with a first AP in a primary BSS, associate with a second AP in a secondary BSS, inform the first and second APs of an inter-BSS relaying capability of the doubly-associated station, and relay data between the first AP and the second AP.

In accordance with an example embodiment, a first AP is provided. The first AP includes a processor, and a non-transitory computer readable storage medium storing programming for execution by the processor. The programming including instructions to configure the first AP to select a station capable of communicating with a second AP, where station is associated with the first AP in a primary BSS, instruct the station to associate with the second AP in a secondary BSS, and transmit data, intended for the second AP, to the station.

Practice of the foregoing embodiments enables a relay device to provide services to multiple overlapping basic service sets, thereby increasing coverage and range.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
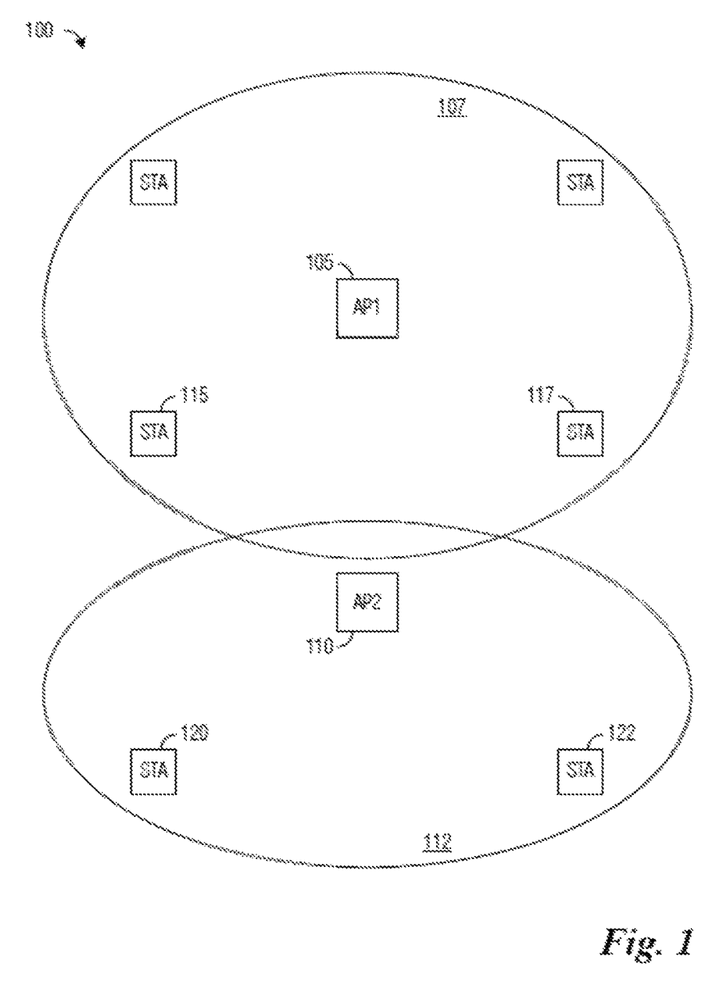
FIG. 1 illustrates an example wireless communications system according to example embodiments described herein.

FIG. 1 illustrates an example wireless communications system 100. Wireless communications system 100 includes access points (APs), such as AP1 105 with coverage area 107 and AP2 110 with coverage area 112. The APs are serving stations, such as stations 115 and 117 served by AP1 105 and stations 120 and 122 served by AP2 110. APs are also commonly referred to as access nodes, base stations, controllers, base terminal controllers, NodeBs, evolved NodeBs (eNBs), Master eNBs (MeNBs), Secondary eNBs (SeNBs), and so on. Similarly, stations are also commonly referred to as mobiles, mobile stations, terminals, users, subscribers, user equipments (UEs), and so on. AP1 105 and the stations that it serves (such as stations 115 and 117) form a first BSS, and AP2 110 and the stations that it serves (such as stations 120 and 122) form a second BSS.

While it is understood that communications systems may employ multiple APs capable of communicating with a number of stations, only two APs and 6 stations are illustrated for simplicity.

Standards such as IEEE 802.11ad introduce the notion of relays. In the standards, however, only stations (STAs) that belong to the same basic service set (BSS) or personal basic service set (PBSS) can communicate via relay. This is a strong limitation on any usage of the relay for range extension purposes.

Presently, a station (STA) can only associate with a single AP, and exchange data only inside that BSS (AP and a collection of stations). Inter-BSS data communication of data is done over a wired connection, e.g., Ethernet, between APs. Therefore the communication between the neighboring APs is constrained by the presence of such wired connections.

One way to communicate over multiple hops is to have no APs and just pure-ad-hoc networks. However this makes the coordination and the security process more complicated and does not take advantage of the AP functionality.

An existing approach in the IEEE 802.11ad technical standards, which is hereby incorporated herein by reference, comprises several steps. In relay capabilities discovery, STAs report their relay capabilities to the PBSS coordination point (PCP)/AP during association or through the exchange of Information request/response frames. For relay search, a source STA, denoted as S hereinafter, discovers the existing relay STAs through the exchange of Relay Search request/response frames with the PCP/AP. For relay selection, the PCP/AP schedules service periods (SPs) for each relay STA, denoted as R hereinafter, provided in the Relay Search response frame.

Beamforming is optionally performed. S transmits a Channel Measurement request to R and receives a Channel Measurement response. In relay link setup (RLS), S transmits an RLS request frame to R, which forwards it to the destination STA, denoted as D hereinafter, which then replies with an RLS response frame. An RLS response frame then is transmitted from R to S. These frames contain the capabilities and the relay transfer parameter set. S transfers data to D via R. In IEEE 802.11ad, S, D, and R are required to belong to the same (P)BSS.

According to an example embodiment, a method and system for relaying between two stations that belong to overlapping (P)BSSs (OBSSs) is provided. An example embodiment provides data transfer between two stations through respective APs or PBSS coordination points (PCPs) via a station in coverage of both the PCPs/APs. While example embodiments are described herein with reference to IEEE 802.11ad, example embodiments can be easily extended to any other wireless communication standards. The embodiment systems and methods described herein can be extended to multi-BSS cross-communication, in which the relaying station belongs to multiple BSSs and can multicast data from one BSS to multiple BSSs at the same time or via multi-user MIMO.

According to an example embodiment, double association, which allows a station with a single medium access control (MAC) entity to associate to two (or more) different PCPs/APs, is provided. Such a station is hereby referred to herein as a doubly-associated station. The first association is the primary association and can follow similar rules and protocols as those described in IEEE 802.11 technical standards and its amendments. The second association is the secondary association, and is distinguished as such during pre-association/association/disassociation signaling, and optionally, during post association communications. The two PCPs/APs and their respective (P)BSSs are primary and secondary, respectively, from the viewpoint of the doubly-associated station. The doubly-associated station communicates in two different (P)BSSs in non-overlapping periods. An example embodiment provides protocols to communicate the availability of a doubly-associated station to the respective PCPs/APs and, optionally, other stations in their respective BSSs. Example embodiments for double association can be generalized to multiple associations. The order of the association also can be interchangeable; in other words a station can associate with a secondary AP first and then with the primary AP.

Figure 2:
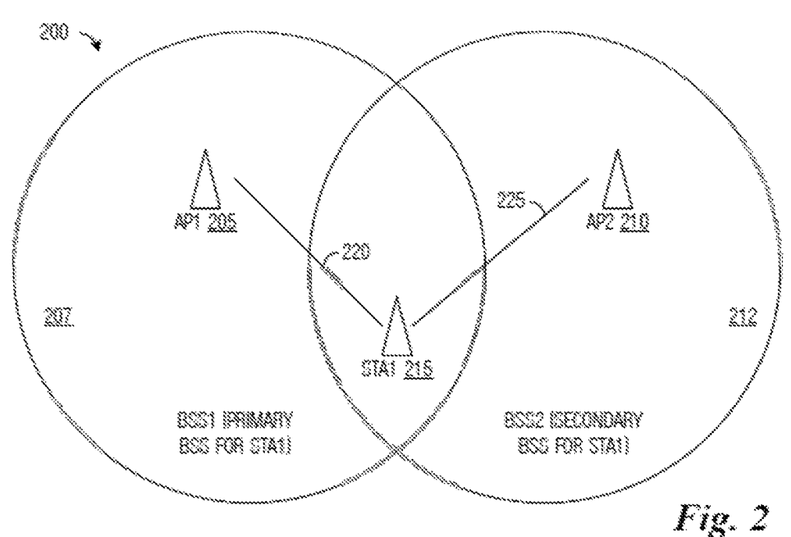
FIG. 2 illustrates an example communications system highlighting a situation where a station is in the coverage area of 2 distinct APs/PCPs and provides data forwarding between these 2 APs according to example embodiments described herein.

FIG. 2 illustrates an example communications system 200 highlighting a situation where a station is in the coverage area of 2 distinct APs/PCPs and provides data forwarding between these 2 APs. Communications system 200 includes a first AP (AP1) 205 with coverage area 207 and a second AP (AP2) 210 with coverage area 212. Located in the coverage of the two APs is a station (STA1) 215. STA1 215 is able to communicate with AP1 205 over link 220. STA1 215 is also able to communicate with AP2 210 over link 225.

In order to facilitate inter-BSS communications, a station provides data forwarding between the two APs, one of the two APs (e.g., AP1 205) identifies the other AP (e.g., AP2 210) as the target of its communications, which may be reached over the air using the station, denoted as an associated station (e.g., STA1 215). The associated station is referred to as an inter-BSS station (IBSTA). The inter-BSS communications between the two APs that is being forwarded by the IBSTA may proceed as follows:

1. AP1 205 generates a list of all stations that are able to communicate with (i.e., receive from and transmit to) AP2 210. A variety of possible techniques may be used to implement the list generation. As an example, AP1 205 uses an existing IEEE 802.11 element referred to as a Beacon Request to request information from stations about their neighboring APs/PCPs. Based on the reports from the stations, AP1 205 selects the station(s) that is able to communicate with AP2 210. As another example, AP1 205 transmits a modified Beacon Request specifying an identifier (e.g., address) of AP2 210. In this example, only those stations that may receive Beacons from AP2 210 will respond with their link metrics with respect to AP2 210. AP1 205 selects a subset of stations from the stations that responded. Examples of the link metrics include Beacon signal to noise ratio (SNR) for AP2 210, traffic load of AP2 210, station battery level, station buffer capacity, a time difference between Beacons of AP1 205 and AP2 210, beacon transmission interval (BTI) of AP2 210, and so on. As yet another example, during an association process, a station provides a list of APs that responded to a Probe Request, along with associated link metrics (such as SNR, signal plus interference to noise ratio (SINR), throughput, and so forth). The list may be used after association by the serving AP (primary or secondary) and/or may be used as an association criteria.

2. AP1 205 transmits a frame (hereby referred to herein as a Secondary Association Request frame) to an associated station (e.g., STA1 215) that is selected from the list of all stations that are able to communicate with AP2 210. STA1 215 associates with AP2 210 as determined in the Secondary Association Request frame. If the association is successful, STA1 215 becomes an IBSTA. STA1 215, after the association is acknowledged by AP2 210, provides a Secondary Association Response frame to AP1 205. STA1 215 also informs AP2 210 (during the association or after completion of the association) that the association between STA1 215 and AP2 210 is a secondary association. The information about the secondary association may be communicated by way of the Association Request transmitted by STA1 215 to AP2 210, or by an Authentication Request transmitted by STA1 215 to AP2 210, or by another dedicated management frame that contains or may be modified to contain the information about the secondary association. AP2 210 may consider the information about the secondary association before allowing the association with STA1 215.

STA1 215 informs AP2 210 that STA1 215 is temporarily leaving the BSS of AP2 210. As an example, STA1 215 informs AP2 210 that it is not available for data communications for a defined period of time. The defined period of time may be specified by a technical standard, an operator of the communications system, an interval specified by STA1 215, or an interval agreed upon by STA1 215 and AP2 210. Alternatively, STA1 215 informs AP2 210 that it is not available for data communications until AP2 210 receives a transmission from STA1 215.

3. STA1 215 informs AP1 205 that it is available for data communications for a defined period of time. The defined period of time may be specified by a technical standard, an operator of the communications system, an interval specified by STA1 215, or an interval agreed upon by STA1 215 and AP1 205. Alternatively, STA1 215 informs AP1 205 that it is not available for data communications until AP1 205 receives a transmission from STA1 215. STA1 215 transmits a Secondary Association Confirmation frame to inform AP1 205, for example.

4. AP1 205 transmits data intended for AP2 210 to STA1 215. As an example, the medium access control (MAC) headers of the frames containing the data includes:

A transmitter address (TA) set to the address of AP1 205,
A receiver address (RA) set to the address of STA1 215, and
A destination address (DA) set to the address of AP2 210.

5. After receiving the data (one or more frames) intended for AP2 210 from AP1. 205, STA1 215 informs AP1 205 that it will be unavailable for data communications for a defined period of time (in a manner similar to STA1 215 informing AP2 210 that it is unavailable for data communications, for example). In other words, STA1 215 will be away from the BSS of AP1 205. The signaling may be achieved using a single bit indicator, in an acknowledgment (ACK) or a block acknowledgement (BA) frame, indicating to AP1 205 that STA1 215 will not be available for data communications until a frame from STA1 215 is received. Examples of the frame include a dedicated frame from STA1 215 or an uplink (UL) transmission. In another example embodiment, STA1 215 informs AP1 205 that it will be unavailable for data communications for a specified period of time (e.g., a number of Beacon Intervals). The specified period of time may be specified by a technical standard, an operator of the communications system, an interval specified by STA1 215, or an interval agreed upon by STA1 215 and AP1 205.

6. STA1 215 transmits the data that is received from AP1 205 but intended for AP2 210 to AP2 210. STA1 215 may set the MAC header of the frame(s) to:

A TA set to the address of STA1 215,
A RA set to the address of AP2 210, and
A source address (SA) set to the address of AP1 205.

STA1 215 may indicate that it is available to receive data from AP2 210 destined for AP1 205. The indication may be a one bit indicator in the MAC header, for example. AP2 210 may transmit data frames intended for AP1 205 to STA1 215.

According to an example embodiment, the two APs/PCPs (e.g., AP1 and AP2) involved in over the air communications select two different stations (e.g., STA1 and STA2) to simplify the data forwarding process. As an illustrative example, STA1 is used to forward data frames from AP1 to AP2, while STA2 is used to forward data frames from AP2 to AP1. The use of two stations instead of one station to provide data forwarding simplifies the communications between the involved devices. For example, bi-directional communication between AP1 and AP2 is supported.

Figure 3A:
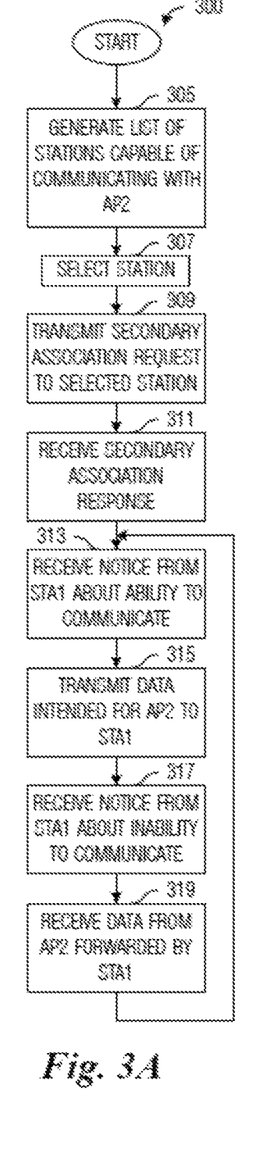
FIG. 3A illustrates a flow diagram of example operations occurring in a first AP participating in inter-BSS communications according to example embodiments described herein.

FIG. 3A illustrates a flow diagram of example operations 300 occurring in a first AP participating in inter-BSS communications. Operations 300 may be indicative of operations occurring in a first AP, such as AP1 205, as the first AP participates in inter-BSS communications.

Operations 300 begin with the first AP generating a list of stations that are capable of communicating with a second AP (block 305). The first AP selects a station (shown in FIG. 2 as STA1, for example) from the list of stations (block 307) and transmits a Secondary Association Request to the selected station (block 309). For discussion purposes, it is assumed that the selected station is able to complete the secondary association with the second AP. The first AP receives a Secondary Association Response from the selected station (block 311). The first AP receives a notification from the selected station indicating that the selected station is able to communicate with the first AP (block 313). The first AP transmits a data frame(s) intended for the second AP to the selected station (block 315). The first AP receives a notification from the selected station indicating that the selected station is unable to communicate with the first AP (block 317). The first AP receives a data frame(s) originating from the second AP from the selected station (block 319). The first AP returns to block 313 to continue the inter-BSS communications.

Figure 3B:
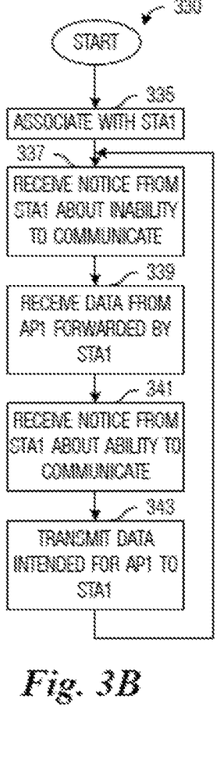
FIG. 3B illustrates a flow diagram of example operations occurring in a second AP participating in inter-BSS communications according to example embodiments described herein.

FIG. 3B illustrates a flow diagram of example operations 330 occurring in a second AP participating in inter-BSS communications. Operations 330 may be indicative of operations occurring in a second AP, such as AP2 210, as the second AP participates in inter-BSS communications.

Operations 330 begin with the second AP participating in a secondary association with a station (block 335). The second AP receives a notification from the station indicating that the station is unable to communicate with the second AP (block 337). The second AP receives a data frame(s) originating from the first AP from the station (block 339). The second AP receives a notification from the station indicating that the station is able to communicate with the second AP (block 341). The second AP transmits a data frame(s) intended for the first AP to the station (block 343). The second AP returns to block 337 to continue the inter-BSS communications.

Figure 3C:
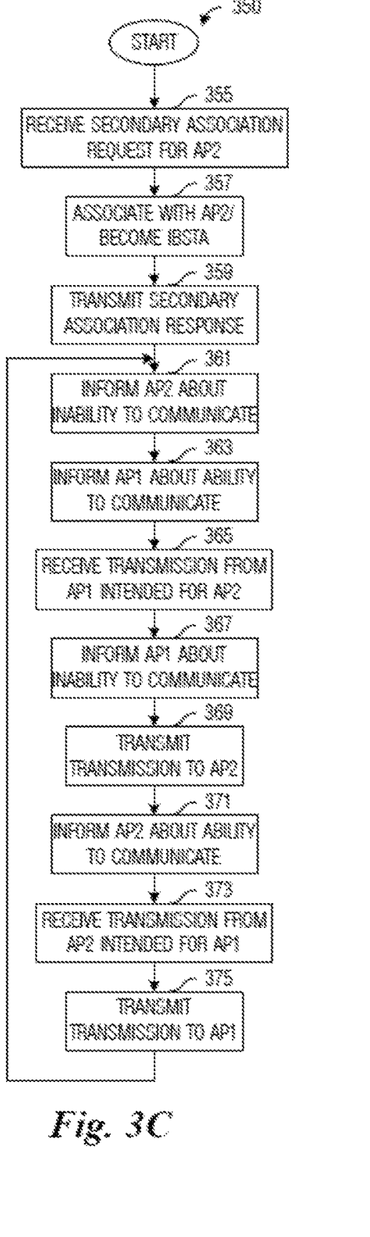
FIG. 3C illustrates a flow diagram of example operations occurring in a station participating in inter-BSS communications according to example embodiments described herein.

FIG. 3C illustrates a flow diagram of example operations 350 occurring in a station participating in inter-BSS communications. Operations 350 may be indicative of operations occurring in a station, such as STA1 215, as the station participates in inter-BSS communications.

Operations 350 begin with the station receiving a Secondary Association Request from a first AP (block 355). The Secondary Association Request requests that the station participate in a secondary association with a second AP. The station performs the secondary association with the second AP and becomes an IBSTA (block 357). For discussion purposes, it is assumed that the station is able to complete the secondary association with the second AP. The station transmits a Secondary Association Response to the first AP (block 359). The station informs the second AP that it is unable to communicate (block 361). The station informs the first AP that it is able to communicate (block 363). The station receives a data frame(s) from the first AP intended for the second AP (block 365). The station informs the first AP that it is unable to communicate (block 367). The station transmits the data frame(s) to the second AP (block 369). The station informs the second AP that it is able to communicate (block 371). The station receives a data frame(s) from the second AP intended for the first AP (block 373). The station transmits the data frame(s) to the first AP (block 375). The station returns to block 361 to continue the inter-BSS communications.

According to an example embodiment, a system and method for inter-BSS relaying between two non-AP/non-PCP stations is provided. In an example embodiment, only a source station and a relay station is required to belong to a first (P)BSS. Similarly, only the relay station and a destination station is required to belong to a second (P)BSS. The first (P)BSS and the second (P)BSS are different (P)BSSs. In an example embodiment, the relay station is associated with different APs/PCPs at the same time. In other words, the relay station belongs to two (P)BSSs at the same time.

Figure 4:
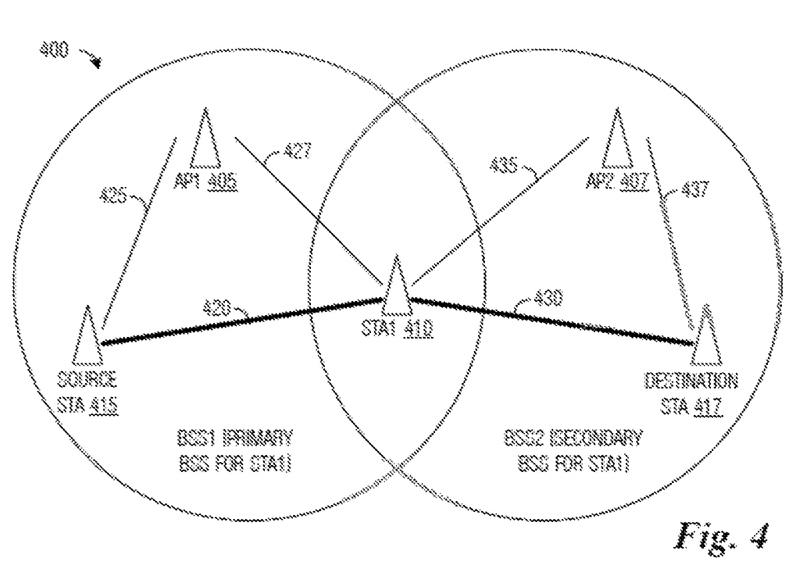
FIG. 4 illustrates an example communications system highlighting inter-BSS relaying between two non-AP/non-PCP stations according to example embodiments described herein.

FIG. 4 illustrates an example communications system 400 highlighting inter-BSS relaying between two non-AP/non-PCP stations. Communications system 400 includes a first AP (AP1) 405, a second AP (AP2) 407, a relay station (STAT) 410, a first station (source STA) 415, and a second station (destination STA) 417. In communications system 400, a link 420 between first station 415 and relay station 410 is achieved by way of links 425 and 427. Similarly, a link 430 between second station 417 and relay station 410 is achieved by way of links 435 and 437.

Relay station 410, operating as an IBSTA, provides inter-BSS relay service for two non-AP/non-PCP stations (i.e., first station 415 and second station 417) that belong to different (P)BSSs. The inter-BSS relay service provided by the IBSTA enables a source STA to communicate with a destination STA that belongs to an overlapping BSS. If the source STA and the destination STA belong to the same (P)BSS, a simple relay discovery procedure, such as suggested in IEEE 802.11ad may be used. However, if the source STA and the destination STA do not belong to the same (P)BSS, but the (P)BSSs overlap, the example embodiments presented herein enable the two stations to communicate.

An example inter-BSS relay process for two non-AP/non-PCP stations belonging to different (P)BSSs may involve:

1. A source STA transmits a frame referred to as a Search IBSTA Request frame to a primary AP (i.e., AP1 405) serving the source STA. The Search IBSTA Request frame includes the address of a destination STA, such as the MAC address of the destination STA.

2. The AP broadcasts (or unicasts) a Destination STA Discovery Request to some or all IBSTAs.

3. An IBSTA that receives the Destination STA Discovery Request transmits the Destination STA Discovery Request to its secondary AP (i.e., AP2 407).

4. The secondary AP receiving the Destination STA Discovery Request responds with a Destination STA Discovery Response, which is transmitted to the IBSTA and either provides an acknowledgement indicating whether the destination STA belongs to that particular (P)BSS or a negative acknowledgement if the destination STA is not associated with the secondary AP. The IBSTA communicates the information back to the primary AP using a Destination STA Discovery Response during the operation of the primary AP. If the presence of the destination STA is confirmed in the secondary (P)BSS, the secondary AP may transmit an unsolicited IBSTA Search Response frame to the destination STA that includes the address of the IBSTA.

5. The primary AP transmits an IBSTA Search Response frame to the source STA, which includes the list of IBSTAs that have confirmed the discovery of the destination STA. The communications between the source STA, the IBSTA, and the destination STA may take place in a variety of ways. As an example, the source STA communicates directly with the IBSTA, which may communicate directly with the destination STA in the secondary (P)BSS. Alternatively, the source STA can communicate with the IBSTA via the primary AP and then the IBSTA communicates with the destination STA in the secondary (P)BSS via the secondary AP. Alternatively, a combination of the examples presented may be used.

Figures 5A, 5B, 5D:
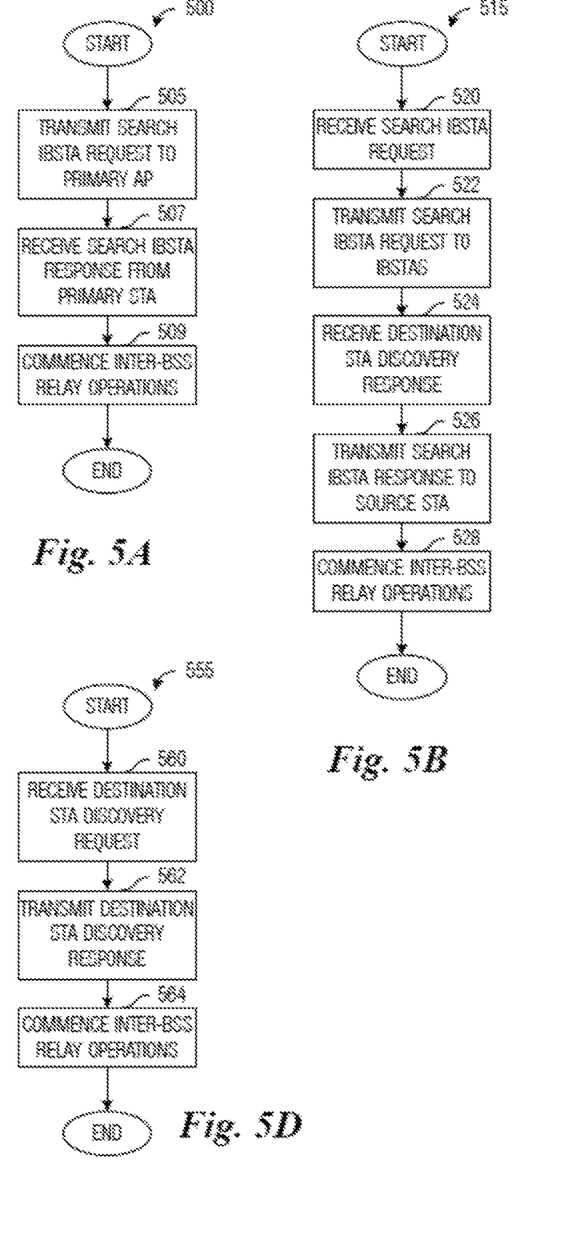
FIG. 5A illustrates a flow diagram of example operations occurring in a source STA participating in inter-BSS relay process for two non-AP/non-PCP stations belonging to different (P)BSSs according to example embodiments described herein.
FIG. 5B illustrates a flow diagram of example operations occurring in a primary AP participating in inter-BSS relay process for two non-AP/non-PCP stations belonging to different (P)BSSs according to example embodiments described herein.
FIG. 5D illustrates a flow diagram of example operations occurring in a secondary AP participating in inter-BSS relay process for two non-AP/non-PCP stations belonging to different (P)BSSs according to example embodiments described herein.

FIG. 5A illustrates a flow diagram of example operations 500 occurring in a source STA participating in inter-BSS relay process for two non-AP/non-PCP stations belonging to different (P)BSSs. Operations 500 may be indicative of operations occurring in a source STA, such as source STA 415.

Operations 500 begin with the source STA transmitting a Search IBSTA Request frame to a primary AP (block 505). The source STA receives a Search IBSTA Response frame from the primary AP (block 507). The Search IBSTA Response frame includes a list of IBSTAs that have confirmed the discovery of a destination STA. The source STA commences inter-BSS relay operations (block 509).

FIG. 5B illustrates a flow diagram of example operations 515 occurring in a primary AP participating in inter-BSS relay process for two non-AP/non-PCP stations belonging to different (P)BSSs. Operations 515 may be indicative of operations occurring in a primary AP, such as AP1 405.

Operations 515 begin with the primary AP receiving a Search IBSTA Request frame from a source STA (block 520). The primary AP transmits a Search IBSTA Request frame to the IBSTAs (block 522). The transmission may be a broadcast or a plurality of unicasts. The primary AP receives a Destination STA Discovery Response frame (block 524). The Destination STA Discovery Response frame includes acknowledgements or negative acknowledgments if a destination STA is associated with a particular (P)BSS. The primary AP transmits a Search IBSTA Response frame to the source STA (block 526). The Search IBSTA Response frame a list of IBSTAs that have confirmed the discovery of a destination STA. The primary AP commences inter-BSS relay operations (block 528).

Figure 5C:
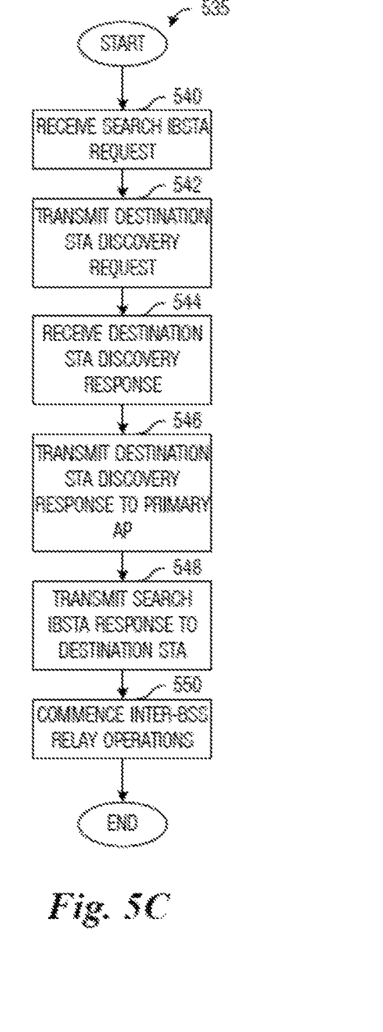
FIG. 5C illustrates a flow diagram of example operations occurring in an IBSTA participating in inter-BSS relay process for two non-AP/non-PCP stations belonging to different (P)BSSs according to example embodiments described herein.

FIG. 5C illustrates a flow diagram of example operations 535 occurring in an IBSTA participating in inter-BSS relay process for two non-AP/non-PCP stations belonging to different (P)BSSs. Operations 535 may be indicative of operations occurring in an IBSTA, such as STA1 410.

Operations 535 begin with the IBSTA receiving a Search IBSTA Request frame from a primary AP (block 540). The IBSTA transmits a Destination STA Discovery Request frame to a secondary AP (block 542). The IBSTA receives a Destination STA Discovery Response frame with acknowledgements or negative acknowledgments if a destination STA is associated with a particular (P)BSS (block 544). The IBSTA transmits a Destination STA Discovery Response frame to the primary AP (block 546). The Destination STA Discovery Response frame includes acknowledgements or negative acknowledgments if a destination STA is associated with a particular (P)BSS from a plurality of secondary APs. The IBSTA optionally transmits a Search IBSTA Response frame to the destination STA (block 548). The IBSTA commences inter-BSS relay operations (block 550).

FIG. 5D illustrates a flow diagram of example operations 555 occurring in a secondary AP participating in inter-BSS relay process for two non-AP/non-PCP stations belonging to different (P)BSSs. Operations 555 may be indicative of operations occurring in a secondary AP, such as AP2 407.

Operations 555 begin with the secondary AP receiving a Destination STA Discovery Request frame from an IBSTA (block 560). The secondary AP transmits a Destination STA Discovery Response frame including an acknowledgement or a negative acknowledgment if a destination STA is associated with a particular (P)BSS (block 562). The secondary AP commences inter-BSS relay operations (block 564).

In a manner similar to inter-BSS communications between PCPs/APs, the IBSTA may explicitly or implicitly announce its availability for data communications in each (P)BSS.

In an example embodiment, the IBSTA operates under a flexible schedule where the schedule is communicated by the PCPs/APs or is announced by the IBSTA. As an example, an IBSTA announces to the primary AP that it is available in the primary (P)BSS as a first time interval and its availability in the secondary (P)BSS as a second time interval. If the activity schedule of the IBSTA is provided by the primary AP, the primary AP may make sure that after the Destination STA Discovery Request frame is transmitted, there is sufficient time to allow the IBSTA to perform discovery in the secondary (P)BSS. As an illustrative example, the primary (P)BSS may request the IBSTA to be present in the primary (P)BSS for two Beacon intervals and in the secondary (P)BSS for another two Beacon intervals. If the IBSTA performs discovery before the expiration of the time interval, the IBSTA may be allowed to transmit the Destination STA Discovery Response frame during a contention-based access period (CBAP) scheduled by the primary AP.

In an alternative embodiment, the primary AP may maintain a record of previous requests/responses and optimize the request to be sent only to those IBSTAs that discovered the particular destination STA in the past. If there is not a positive response, a second discovery phase with a larger set of IBSTAs may be permitted to take place.

With respect to IBSTA scheduling, a primary AP schedules a service period (SP) within an Extended Schedule element having the SA set to the address of the source STA and the DA set to the address of the IBSTA within its Extended Schedule element for each IBSTA. The duration of the SP is set to a value that allows for the implementation of beamforming training. The scheduling of the SP may be performed for each IBSTA or for a subset of IBSTAs that have announced their ability to reach the destination STA.

Similarly, the secondary AP schedules an SP using an Extended Schedule element with a SA set to the address of an IBSTA that previously transmitted a Destination STA Discovery Request frame and a DA set to the address of the destination STA. The primary AP and the secondary AP will schedule the SPs during the periods that IBSTA has announced availability in the (P)BSS. The duration of the SP is set to a value that allows for the implementation of beamforming training. During the selection of the IBSTA, the source STA selects the most appropriate IBSTA for the data transfer.

As an illustrative example, in order to achieve a good link for communications:

The source STA transmits a Link Quality Request to the IBSTA with which the source STA performed beamforming training with during a scheduled SP (as discussed previously) and returned a positive acknowledgement Destination STA Discovery Response frame.

The IBSTA transmits (in the secondary (P)BSS) the Link Quality Request to the destination STA. Both the destination STA and the IBSTA reply to the Link Quality Requests with Link Quality Responses. It is noted that the Link Quality Response from the IBSTA may contain information for links from the IBSTA to the destination STA and from the source STA to the IBSTA, while the Link Quality Response from the destination STA may contain information for a link from the IBSTA to the destination STA.

As another illustrative example, in order to achieve a good link for communications:

The source STA transmits a Link Quality Request to the IBSTA with which the source STA performed beamforming training with during a scheduled SP and the IBSTA replies with a Link Quality Response, which includes link channel measurements, for example.

The IBSTA transmits (in the secondary (P)BSS) the Link Quality Request to the destination STA. The destination STA responds with a Link Quality Response. The Link Quality Response from the destination STA may contain information for a link from the IBSTA to the destination STA. The IBSTA forwards the Link Quality Response to the source STA. Once the procedure is complete, the source STA is aware of the link quality measurements of links between itself and the IBSTA and between the IBSTA and the destination STA.

The selection of the IBSTA by the source STA may be performed using any implementation specific algorithm. Additionally, multiple IBSTAs may be selected instead of just one IBSTA.

During the data transfer, a source STA transmits data to the IBSTA and the IBSTA transmits the data to the destination STA. In order to accomplish the data transmissions, both the primary AP and the second AP will schedule SPs so that the SPs do not overlap in time. Signaling through the IBSTA or directly between the primary and secondary APs help to ensure that the SPs do not overlap. It is noted that the primary and secondary APs may be able to communicate directly if they use a low data rate link. However, the low data rate link is generally not suitable for data communications and the IBSTA is still required for data communications.

When the SPs are scheduled, the source and destination STAs consecutively communicate the data using the SPs. If the SP schedules are quasi-static in nature, there may be situations where an SP is shorter or longer than required for the data communications. This is a function of the relative data rates of the links between the source STA and the IBSTA pair and the IBSTA and the destination STA pair and the length of the scheduled SPs. If an SP is shorter than required for the data communications, the source STA will be informed through a smaller than expected number of delivered packets as indicated by an ACK/BA frame from the IBSTA. Therefore, the source STA may be able to increase the data rate accordingly. If the SP is longer than required for the data communications, the source STA may be able to truncate the SP provided that a corresponding Extended Schedule element indicates that the SP is truncatable.

The data transfer may also be performed in CBAPs by either or both (P)BSSs. To support data transfer in CBAPs, the IBSTA informs both the primary AP and the second AP of uncertainty for a certain period of time, e.g., a number of Beacon Intervals or until the IBSTA informs its availability to either the primary AP or the second AP by transmitting an UL frame. The unavailability time may be constrained, by either the primary AP or the second AP, for example, in order to distinguish between a temporarily unavailable IBSTA and an IBSTA that has lost connection with the primary AP or the second AP for any reason.

Figure 6:
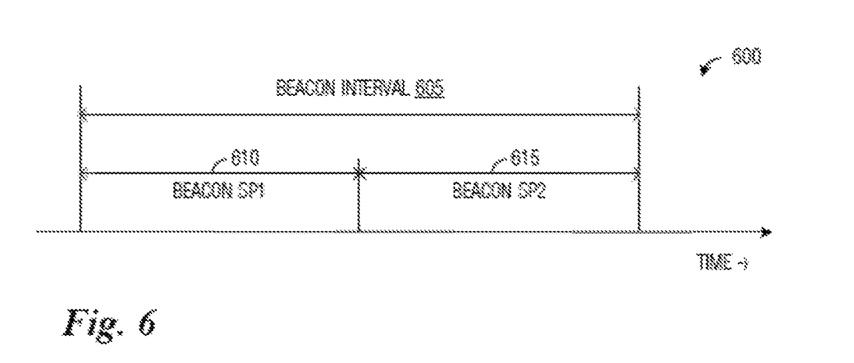
FIG. 6 illustrates a diagram of Beacon SPs within a Beacon interval according to example embodiments described herein.

The IEEE 802.11ad technical standards allow PCPs/APs that are in close proximity to one another to form a cluster and share the medium in a time division fashion. Inter-BSS relaying between PCPs/APs that have formed a cluster may be advantageous in the sense that communications within different (P)BSSs are limited to their respective, non-overlapping intervals (referred to as Beacon Service Periods (Beacon SPs)) within a Beacon interval. FIG. 6 illustrates a diagram 600 of Beacon SPs within a Beacon interval. As shown in FIG. 6, a Beacon interval 605 includes 2 Beacon SPs, a first Beacon SP (SP1) 610 and a second Beacon SP (SP2) 615.

The IEEE 802.11ad technical standards provide protocols through which a station that is within the coverage of one or more PCPs/APs may report the overlap to its own PCP/AP and request a decentralized clustering with the one or more PCPs/APs. This process may be facilitated through an IBSTA because the IBSTA may request decentralized clustering from the two PCPs/APs and, furthermore, assist with relaying the control frames that are exchanged between the two PCPs/APs to negotiate the clustering parameters, such as the timings of the Beacon Intervals and the Beacon SPs corresponding to the two (P)BSSs. Once the cluster is set up, and the two PCPs/APs share the medium accordingly, the two PCPs/APs can schedule communications with the IBSTA in a manner similar to any other station because the non-overlapping Beacon SPs guarantee that the IBSTA will be available for communications within a (P)BSS during a corresponding Beacon SP.

If the primary AP does not intend to continue inter-BSS communications, the primary AP may transmit a request (a Secondary Disassociation Request, for example) frame to the IBSTA to end its association with the secondary AP. The IBSTA confirms the disassociation with the secondary AP by transmitting a frame (a Secondary Disassociation Confirmation frame, for example). The IBSTA may use an unsolicited Secondary Disassociation Confirmation frame if the IBSTA loses its connection with the secondary AP or if the IBSTA disassociated from the secondary AP for any reason.

In the situation where the IBSTA loses the connection with or disassociates from the primary AP, the IBSTA also disassociates from the secondary AP. The IBSTA may then associate with the PCP/AP as its primary association. In a different example embodiment, the IBSTA directly communicates with the secondary AP to change its association type from secondary to primary. This association type change may be performed using a dedicated frame or by transmitting an Association Request frame that implicitly informs the secondary AP of the intention of the station to change the association type to primary.

The example embodiments presented herein may be extended to add multiuser multiple input multiple output (MU-MIMO) deployments. As an example, the IBSTA may communicate with multiple destination stations. In another example embodiment, the source STA may combine a transmission to the IBSTA with a transmission to another station that belongs to the same (P)BSS, i.e., the primary (P)BSS, using MU-MIMO or another multiuser technology, if the source STA wants to communicate to a station in the primary (P)BSS and a station in the secondary (P)BSS, for instance.

Figure 7:
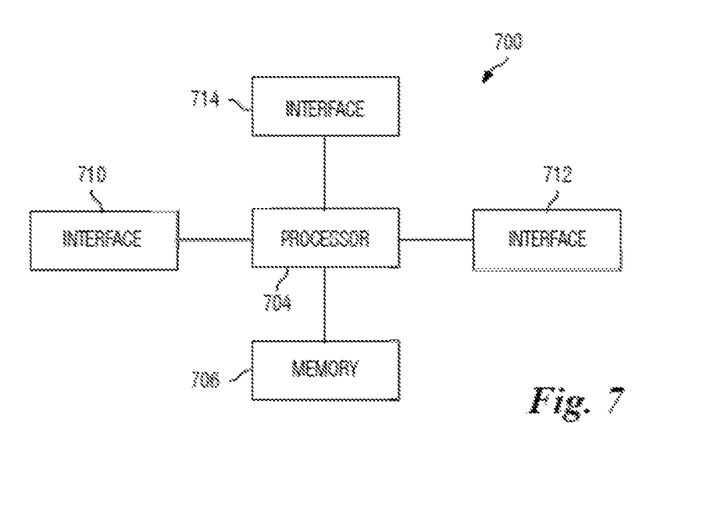
FIG. 7 illustrates a block diagram of an embodiment processing system for performing methods described herein.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
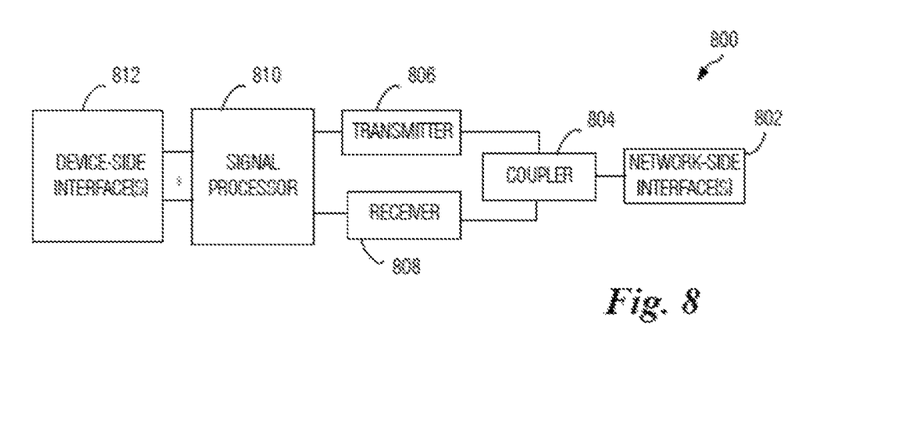
FIG. 8 illustrates a block diagram of a transceiver adapted to transmit and receive signaling over a telecommunications network according to example embodiments described herein.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an associating unit/module, an informing unit/module, a relaying unit/module, an indicating unit/module, a selecting unit/module, and/or an instructing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for multiple association, the method comprising:
   associating, by an associated station, with a first access point (AP) in a primary basic service set (BSS);
   associating, by the associated station, with a second AP in a secondary BSS;
   informing, by the associated station, the first and second APs of an inter-BSS relaying capability of the associated station; and
   relaying, by the associated station, data between the first AP and the second AP.

2. The method of claim 1, wherein transmissions involved in associating with the first AP, associating with the second AP, and informing the first and second APs utilize beamforming.

3. The method of claim 1, wherein relaying the data between the first AP and the second AP comprises:
   receiving, by the associated station, the data from the first AP; and
   transmitting, by the associated station, the data to the second AP.

4. The method of claim 3, wherein the data comprises a destination address field set to an address of the second AP.

5. The method of claim 3, wherein the data comprises a destination address field set to an address of a first destination station served by the second AP.

6. The method of claim 3, wherein informing the first and second APs comprises:
   indicating, by the associated station, to the first AP that the associated station is able to communicate for a first duration equal to at least one of a specified first period of time or until the associated station transmits to the first AP; and
   indicating, by the associated station, to the second AP that the associated station is unable to communicate for a second duration equal to at least one of a specified second period of time or until the associated station transmits to the second AP.

7. The method of claim 3, further comprising:
   receiving, by the associated station, additional data from the second AP; and
   transmitting, by the associated station, the additional data to the first AP.

8. The method of claim 7, wherein the additional data comprises a destination address field set to an address of a second destination station served by the first AP.

9. The method of claim 7, wherein the additional data comprises a destination address field set to an address of the first AP.

10. The method of claim 7, wherein informing the first and second APs comprises:
    indicating, by the associated station, to the second AP that the associated station is able to communicate; and
    indicating, by the associated station, to the first AP that the associated station is unable to communicate.

11. The method of claim 1, wherein the data originated at a first station associated with the first AP and is destined for a second station associated with the second AP.

12. A associated station comprising:
a non-transitory memory storage comprising instructions; and
a processor in communication with the non-transitory memory storage, wherein the processor executes the instructions to:
associate with a first access point (AP) in a primary basic service set (BSS),
associate with a second AP in a secondary BSS,
inform the first and second APs of an inter-BSS relaying capability of the associated station, and
relay data between the first AP and the second AP.

13. The associated station of claim 12, wherein transmissions involved in associating with the first AP, associating with the second AP, and informing the first and second APs utilize beamforming.

14. The associated station of claim 12, wherein the processor executes the instructions to receive the data from the first AP, and transmit the data to the second AP.

15. The associated station of claim 14, wherein the data comprises a destination address field set to an address of the second AP.

16. The associated station of claim 14, wherein the data comprises a destination address field set to an address of a first destination station served by the second AP.

17. The associated station of claim 14, wherein the processor executes the instructions to:
indicate to the first AP that the associated station is able to communicate for a first duration equal to at least one of a specified first period of time or until the associated station transmits to the first AP, and
indicate to the second AP that the associated station is unable to communicate for a second duration equal to at least one of a specified second period of time or until the associated station transmits to the second AP.

18. The associated station of claim 14, wherein the processor executes the instructions to:
receive additional data from the second AP, and
transmit the additional data to the first AP.

19. The associated station of claim 18, wherein the additional data comprises a destination address field set to an address of a second destination station served by the first AP.

20. The associated station of claim 18, wherein the additional data comprises a destination address field set to an address of the first AP.

21. The associated station of claim 18, wherein the processor executes the instructions to:
indicate to the second AP that the associated station is able to communicate, and
indicate to the first AP that the associated station is unable to communicate.

22. The associated station of claim 12, wherein the data originated at a first station associated with the first AP and is destined for a second station associated with the second AP.

* * * * *

UNITED STATES PATENT AND TRADEMARK OFFICE
CERTIFICATE OF CORRECTION

PATENT NO. : 10,250,315 B2  
APPLICATION NO. : 15/393040  
DATED : April 2, 2019  
INVENTOR(S) : George Calcev Page 1 of 1

It is certified that error appears in the above-identified patent and that said Letters Patent is hereby corrected as shown below:

In the Claims

In Column 15, Line 4, Claim 12, delete "A associated station" and insert --An associated station--.

Signed and Sealed this
Eighteenth Day of June, 2019

Andrei Iancu
*Director of the United States Patent and Trademark Office*